J. V. WOODWORTH.
FASTENER.
APPLICATION FILED FEB. 13, 1919.
1,302,263. Patented Apr. 29, 1919.
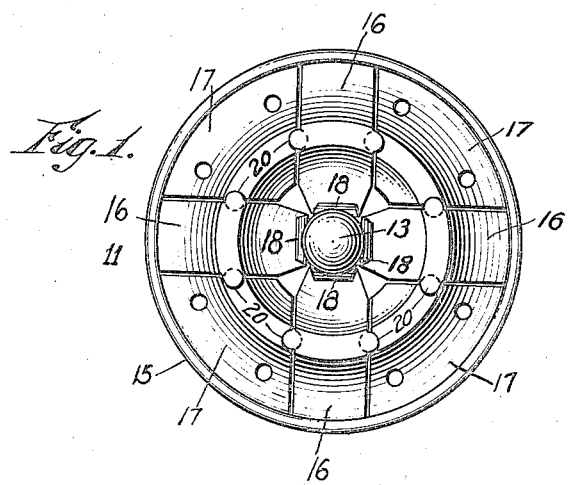
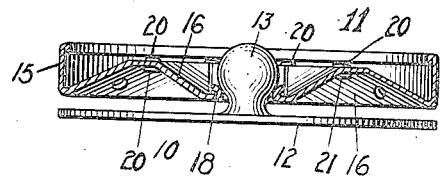
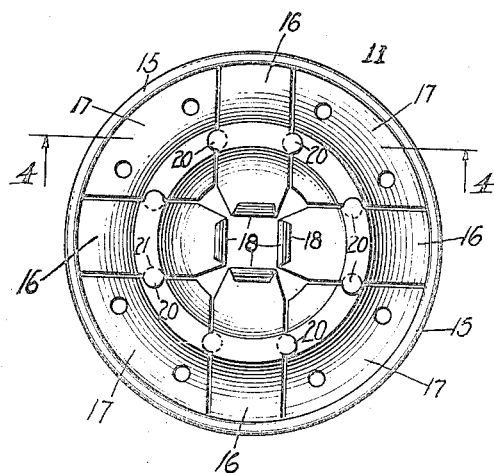
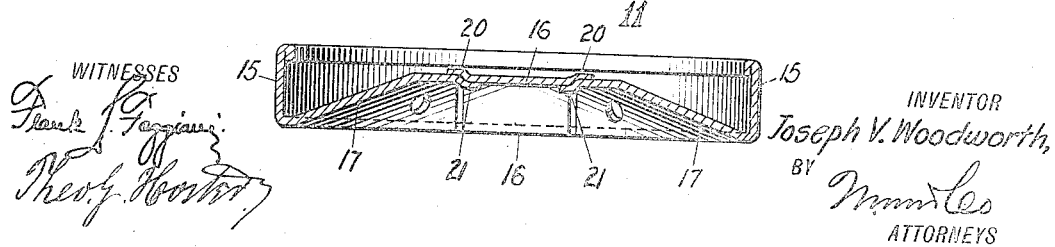
INVENTOR
Joseph V. Woodworth,
BY
ATTORNEYS
WITNESSES

UNITED STATES PATENT OFFICE.

JOSEPH V. WOODWORTH, OF BROOKLYN, NEW YORK, ASSIGNOR OF ONE-HALF TO JAMES H. DEVEREUX, OF SAGAPONACK, NEW YORK.

FASTENER.

1,302,263.

Specification of Letters Patent.   Patented Apr. 29, 1919.

Application filed February 13, 1919. Serial No. 276,713.

*To all whom it may concern:*

Be it known that I, JOSEPH V. WOODWORTH, a citizen of the United States, and a resident of the city of New York, borough of Brooklyn, in the county of Kings and State of New York, have invented a new and Improved Fastener, of which the following is a full, clear, and exact description.

The invention relates to snap fasteners of the stud and spring member type, and its object is to provide a new and improved snap fastener which is simple and durable in construction, cheap to manufacture, and arranged to easily press the stud into engagement with the spring member to securely hold the stud in position to prevent accidental disengagement of the stud from the spring member. Another object is to provide resilient retaining members capable of yielding easily in one direction for the passage of the head of the stud to engage the under side thereof and to restrain the spring members from yielding easily in an opposite direction thus requiring considerable force on the part of the user to disengage the stud from the spring member.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is an enlarged plan view of the fastener;

Fig. 2 is a sectional side elevation of the spring member with the stud in position and shown in elevation;

Fig. 3 is a plan view of the spring member; and

Fig. 4 is an enlarged sectional side elevation of the same on the line 4—4 of Fig. 3.

The fastener in its general construction consists of a stud member 10 and a spring member 11. The stud member 10 comprises a disk 12 from which is struck up a head 13, as plainly indicated in Fig. 2. The spring member 11 is made from a single piece of spring steel or other suitable spring material and its body is of disk shape and comprises a turned-up rim 15, spring tongues 16 and restraining members 17. The spring tongues 16 extend radially from the rim 15 in an inward direction and the inner free ends of the spring tongues 16 are provided with return bends 18 to allow the head 13 to be pressed easily into position with the spring tongues 16 yielding in an upward direction throughout the entire length thereof. The spring tongues 16 are preferably of inverted V shape, as plainly indicated in Fig. 2, the apex being approximately at the middle of each spring tongue, and each spring tongue is provided with sidewise extending lugs 20 overlying similar lugs 21 formed on the sides of the restraining members 17 whereby the tongues 16 are free to yield in an upward direction but are restrained from yielding in a downward direction thus insuring a secure holding of the head 13 in position on the spring tongues 16 and requiring considerable force on the part of the user for disengaging the head 13 from the free ends of the spring members 16. The restraining members 17 are bent upward and inward from the rim 15 to act as braces for the spring tongues 16 with a view to restrain the same in their downward movement on pulling the head 13 out of engagement with the free ends 18 of the spring tongues 16.

The fastener shown and described is very simple and durable in construction and can be cheaply manufactured as comparatively little metal is needed for forming either the stud members or the spring members.

It will also be noticed that by the arrangement described the head 13 of the stud 10 can be easily pressed into engagement with the free ends of the spring tongues 16, and when it is desired to draw the head from the spring members then considerable force has to be exerted on the part of the user in order to overcome the resistance offered by the spring tongues especially as the said spring tongues abut midway of their length against the lugs 21 and hence the resiliency of the spring tongues in this direction is considerably decreased.

Having thus described my invention, I claim as new and desire to secure by Letters Patent:—

1. A stud holding member for a fastener, comprising a body having resilient retaining members adapted to freely yield in one direction throughout the lengths of the retaining members to allow easy passage of the head of a stud and to engage the under side of the said head to hold the stud in place, and retaining means engaging the said retaining members intermediate the ends thereof to resist movement of the said retaining members in an opposite direction.

2. A stud holding member for a fastener made from a single piece of spring material, comprising a disk, spring tongues struck up integrally from the said disk and extending radially inward from the rim of the disk, the said tongues being adapted to yield in one direction when pressed by the head of a stud to allow easy passage of the said head to engage the under side thereof to hold the stud in place, and restraining means on the said disk and engaging the said tongues intermediate the ends thereof to resist movement of the tongues in an opposite direction.

3. A stud holding member for a fastener made from a single piece of spring material, comprising a disk, spring tongues struck up integrally from the said disk and extending radially inward from the rim of the disk, the said tongues being adapted to yield in one direction when pressed by the head of a stud to allow easy passage of the said head to engage the under side therof to hold the stud in place, and restraining members struck up on the said disk and extending intermediate the said tongues, the said restraining members and the said tongues having lugs engaging one the other intermediate the ends of the tongues to restrain the latter from yielding in an opposite direction.

JOSEPH V. WOODWORTH.